(12) United States Patent
Chen et al.

(10) Patent No.: US 9,083,885 B1
(45) Date of Patent: Jul. 14, 2015

(54) FIXED FOCUS CAMERA MODULE WITH NEAR-FIELD IMAGE RECOGNITION

(71) Applicant: Google Inc., Mountain View, CA (US)

(72) Inventors: Xi Chen, San Jose, CA (US); Lu Gao, San Jose, CA (US); Xiaoyu Miao, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 16 days.

(21) Appl. No.: 14/083,137

(22) Filed: Nov. 18, 2013

(51) Int. Cl.
G02B 27/00 (2006.01)
H04N 5/232 (2006.01)
H04N 5/378 (2011.01)

(52) U.S. Cl.
CPC ........... *H04N 5/23296* (2013.01); *H04N 5/378* (2013.01); *G02B 27/0025* (2013.01); *G02B 27/0037* (2013.01)

(58) Field of Classification Search
CPC ............. G02B 5/1814; G02B 27/0037; G02B 27/0172; G02B 27/4216; G02B 27/4211; G02B 27/0025; G02B 2027/0134; G02B 2027/011; G02B 2027/0116; G02B 15/173; G02B 13/146; G02B 13/0045; G02B 13/06; G02B 13/18; G02B 9/62; G02B 5/189; H04N 5/2254
See application file for complete search history.

(56) References Cited

U.S. PATENT DOCUMENTS

| | | |
|---|---|---|
| RE35,310 E | 8/1996 | Moskovich |
| 5,959,785 A * | 9/1999 | Adachi .......................... 359/692 |
| 6,804,066 B1 | 10/2004 | Ha et al. |
| 7,649,693 B2 | 1/2010 | Kuroda et al. |
| 7,663,814 B2 | 2/2010 | Kitahara |
| 8,000,030 B2 * | 8/2011 | Tang .............................. 359/714 |
| 8,395,852 B2 | 3/2013 | Tsai et al. |
| 8,441,746 B2 | 5/2013 | Hsieh et al. |
| 8,456,758 B1 | 6/2013 | Huang et al. |
| 8,456,763 B2 | 6/2013 | Hsieh et al. |
| 8,462,449 B2 | 6/2013 | Hsu et al. |
| 8,508,865 B2 | 8/2013 | Teraoka |
| 2004/0165090 A1 * | 8/2004 | Ning .............................. 348/272 |
| 2012/0026285 A1 * | 2/2012 | Yoshida et al. ................. 348/36 |
| 2012/0188657 A1 * | 7/2012 | Hsu et al. ....................... 359/716 |
| 2013/0002908 A1 * | 1/2013 | Ben-Eliezer et al. ......... 348/242 |
| 2014/0085513 A1 * | 3/2014 | Tashiro et al. ............. 348/240.3 |
| 2014/0085615 A1 * | 3/2014 | Pretorius et al. ................ 353/99 |

OTHER PUBLICATIONS

Guichard, F et al. "Extended depth-of-field using sharpness transport across color channels", SPIE Proceedings vol. 7250, Digital Photography V, 72500N, Jan. 19, 2009, 13 pages.

* cited by examiner

*Primary Examiner* — Timothy J Henn
*Assistant Examiner* — Pritham Prabhakher
(74) *Attorney, Agent, or Firm* — Blakely Sokoloff Taylor & Zafman LLP

(57) ABSTRACT

A camera apparatus includes an image sensor to output an image signal, a stop aperture, a lens assembly, and a controller. The lens assembly is disposed between the image sensor on an image side of the lens assembly and the stop aperture on an object side of the lens assembly. The lens assembly includes a plurality of lens elements that collectively induce axial chromatic aberration between red, green, and blue light. The controller is coupled to receive red, green, and blue channels of the image signal. The controller includes logic that causes the controller to use the blue channel without the red or green channels of the image signal to perform image recognition on objects captured in a near-field of the lens assembly and to use the blue, red, and green channels collectively when capturing images in a far-field of the lens assembly.

24 Claims, 11 Drawing Sheets

Conventional Lens with 10 um Axial Color Aberration (@ 1.5 m Obj. Distance)

RGB Image from Conventional Lens with 10 um Axial Color Aberration (@ 0.2 m Obj. Distance)

Current Lens Design with 42 um Axial Color Aberration (@1.5 m Obj. Distance)

Blue Channel Image from Current Lens Design with 42 um Axial Color Aberration (@ 0.2 m Obj. Distance)

| EfL = 2.795mm, Fno =2.4, HFOV = 45deg. | | | | | | |
|---|---|---|---|---|---|---|
| Surface # | | Radius of Curvature (mm) | Thickness (mm) | Material | Refractive Index at 587.6nm | Abbe # | Focal Length (mm) |
| S0 | object | Plano | Infinity | air | | | |
| S1 | Aperture Stop | Plano | -0.082 | air | | | |
| S2 | Lens1 (L1) | 1.846 | 0.211 | plastics | 1.63 | 23.8 | 13.748 |
| S3 | | 2.232 | 0.090 | air | | | |
| S4 | Lens2 (L2) | 2.134 | 0.332 | plastics | 1.55 | 55.8 | 6.239 |
| S5 | | 5.339 | 0.090 | air | | | |
| S6 | Lens3 (L3) | 28.257 | 0.200 | plastics | 1.64 | 23.0 | -19.420 |
| S7 | | 8.655 | 0.097 | air | | | |
| S8 | Lens4 (L4) | 1.782 | 0.231 | plastics | 1.54 | 55.9 | 174.477 |
| S9 | | 1.733 | 0.225 | air | | | |
| S10 | Lens5 (L5) | -3.618 | 0.650 | plastics | 1.54 | 55.9 | 2.271 |
| S11 | | -0.982 | 0.293 | air | | | |
| S12 | Lens 6 (L6) | 6.424 | 0.650 | plastics | 1.63 | 23.3 | -2.789 |
| S13 | | 1.338 | 0.220 | air | | | |
| S14 | IRCF | Plano | 0.25 | glass | 1.517 | 64 | infinity |
| S15 | | Plano | 0.550 | air | | | |
| S16 | Image Plane | Plano | | | | | |

FIG. 12A

| Surface # | | Conic Constant | Aspheric Coefficients | | | | | | |
|---|---|---|---|---|---|---|---|---|---|
| | | | A4 | A6 | A8 | A10 | A12 | A14 | A16 |
| 2 | Lens1 (L1) | -16.961 | 0.206 | -0.233 | -0.233 | 1.745e-3 | 1.479 | -2.416 | -1.730 |
| 3 | | -23.505 | 0.026 | -0.025 | -0.043 | -0.082 | -3.132 | -1.250 | 7.043 |
| 4 | Lens2 (L2) | -11.918 | -0.083 | 0.449 | -0.341 | -1.218 | 1.463 | 3.377 | -14.015 |
| 5 | | 44.713 | -0.330 | -0.338 | 0.112 | 1.039 | -1.536 | -2.902 | 0.108 |
| 6 | Lens3 (L3) | -2214.791 | -0.069 | -0.849 | -0.018 | -0.064 | 0.810 | 0.487 | -0.965 |
| 7 | | 83.638 | 0.028 | -0.173 | -0.103 | -0.141 | -0.521 | 2.516 | -1.790 |
| 8 | Lens4 (L4) | -14.109 | -0.197 | -0.050 | 0.205 | -0.020 | -0.943 | 0.894 | -0.108 |
| 9 | | -7.595 | -0.176 | 0.052 | -6.384e-3 | 7.892e-4 | -0.113 | 0.025 | 8.315e-3 |
| 10 | Lens5 (L5) | 9.334 | 0.024 | 0.069 | -0.024 | 0.107 | -0.130 | -0.111 | 0.118 |
| 11 | | -0.658 | -0.021 | 0.015 | 0.021 | 0.021 | 8.864e-3 | -0.035 | 0.021 |
| 12 | Lens6 (L6) | 0.597 | -0.293 | 0.136 | -0.063 | 0.026 | 1.103e-3 | -0.011 | 2.835e-3 |
| 13 | | -6.085 | -0.105 | 0.023 | 3.32e-5 | -1.602e-3 | 1.772e-4 | 2.588e-5 | -4.358e-6 |

FIG. 12B

FIXED FOCUS CAMERA MODULE WITH NEAR-FIELD IMAGE RECOGNITION

TECHNICAL FIELD

This disclosure relates generally to the field of optics, and in particular but not exclusively, relates to fixed focus lens assemblies and camera modules.

BACKGROUND INFORMATION

Conventional digital imaging devices or cameras often include a lens assembly (which includes multiple lens elements) that focuses image light onto an image sensor that measures the image light and generates an image based on the measurements. FIG. 1 illustrates a common configuration for a digital imaging device 100, which includes an image sensor 110 and a lens assembly 115 including multiple lens elements 120. Lens assembly 115 is disposed over image sensor 110 to focus image light 125 from an object onto the pixels of image sensor 110. Lens assembly 115 may include convex and/or concave lens elements 120 that together give lens assembly 115 an effective focal length ("EFL"). The lens assembly 115 also provides a certain Depth of Field ("DOF"). DOF refers to the range of distances in the field of view of an image sensor that appear to be well focused in an image captured by image sensor 110. The Field of View ("FOV") of lens assembly 115 refers to the angular extent that is viewable through lens assembly 115 at a given moment.

Lens assembly 115 has a z-axis height H1, which is also referred to as the optical total track length ("TTL"). The optical TTL is typically influenced by the FOV and the size of image sensor 110, as well as other design choices. A larger optical TTL may limit the applications or uses of digital imaging device 100 because of space constraints. Therefore, a lens assembly that allows a digital imaging device to capture high resolution images with a large FOV while reducing the optical TTL can be advantageous. A lens assembly that provides a large DOF where both far and near images are brought into focus is also desirable.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. The drawings are not necessarily to scale, emphasis instead being placed upon illustrating the principles being described.

FIGS. 12A & 12B are tables that provide design parameters for implementing a demonstrative lens assembly having axial color aberration to improve near-field image recognition, in accordance with an embodiment of the disclosure.

DETAILED DESCRIPTION

Embodiments of a system and apparatus for a lens assembly that provides improved near-field image recognition capabilities with a large field of view ("FOV") and short optical total track length ("TTL") are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Head wearable displays are becoming portable computing devices that are used for everyday tasks such as capturing far-field (e.g., greater than 1 m object distance) full color pictures for personal use (e.g., memory savers, social media sharing, etc.) and capturing near-field (e.g., less than 1 m) images for image recognition tasks. Near-field image recognition tasks can include optical character recognition ("OCR"), bar code scanning, 2D code recognition (e.g., QR codes, data matrix codes, etc.), feature recognition, object recognition, etc. Accordingly, a camera module capable of acquiring high quality full color far-field images while also being capable of acquiring high quality near-field images acceptable for image recognition is desirable for head wearable displays.

Camera modules for use in head wearable displays should also have a FOV ranging between 80 to 110 degrees (and in particular between 88 and 100 degrees). In contrast, cell phone cameras typically have a FOV in the 64 to 75 degree range and don't have as tight form factor constraints. Other conventional lens assemblies, such as fish eye lenses, are designed to have very wide fields of view, typically above 120 degrees, but are not well suited for typical wearable computing tasks. Finally, such camera modules should also be compact and light weight. As such, fixed focus lenses provide the smallest and lightest form factors.

Figure 1:
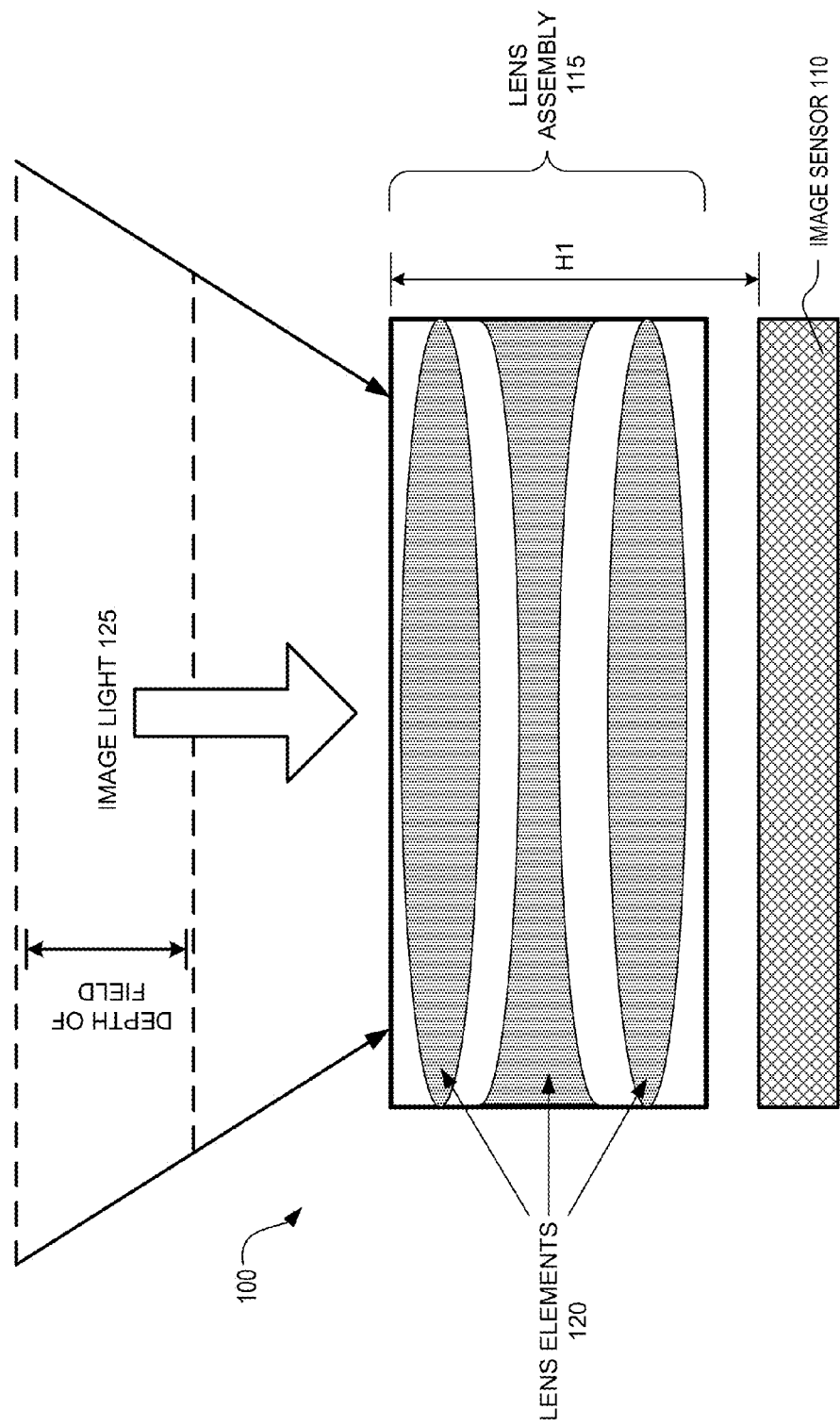
FIG. 1 (Prior Art) illustrates a conventional lens assembly for a camera module.
Figure 2:
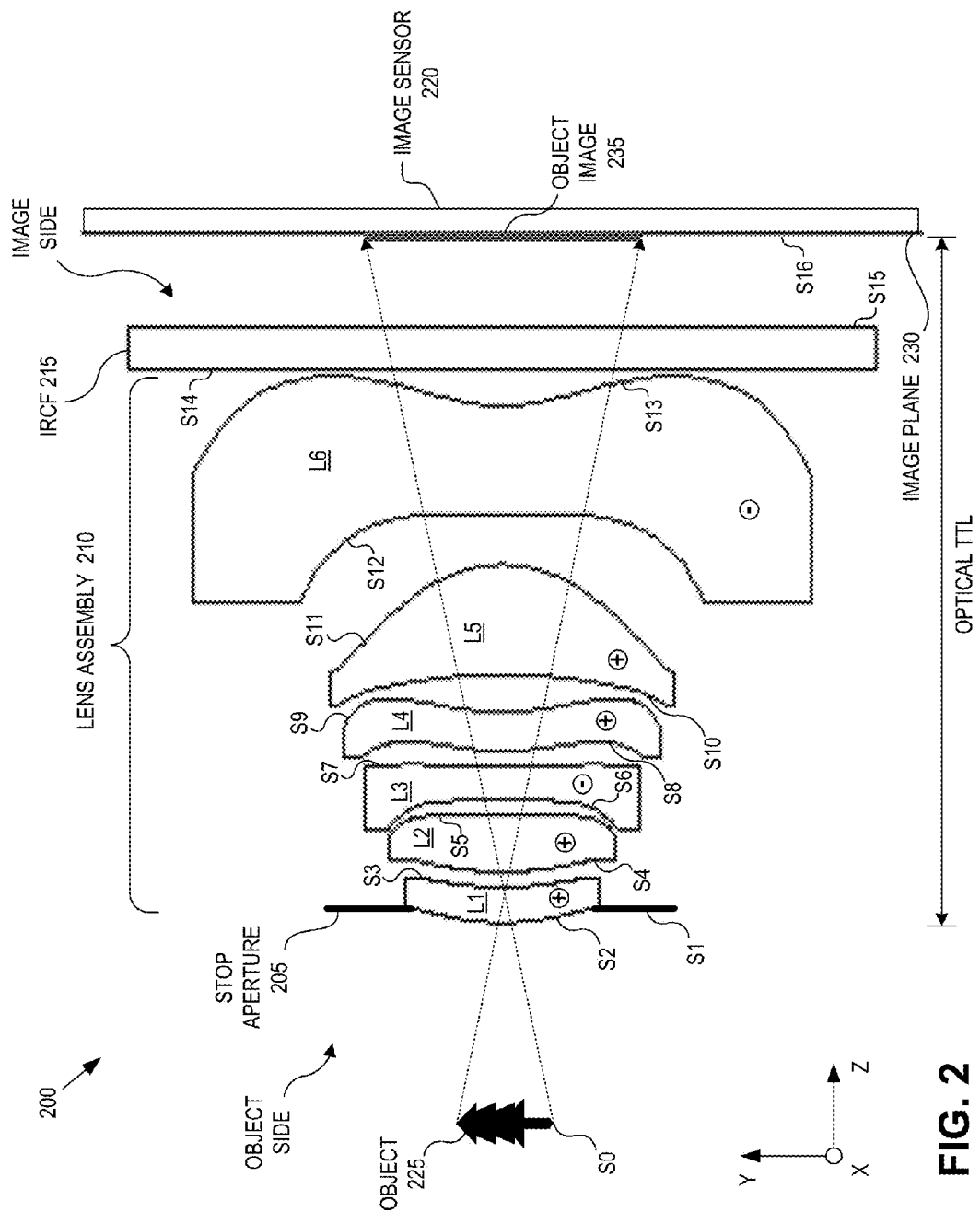
FIG. 2 is a cross-sectional view illustrating a camera module having a lens assembly that provides a large field of view ("FOV") with reduced optical total track length ("TTL") and improve near-field image recognition, in accordance with an embodiment of the disclosure.
Figure 3:
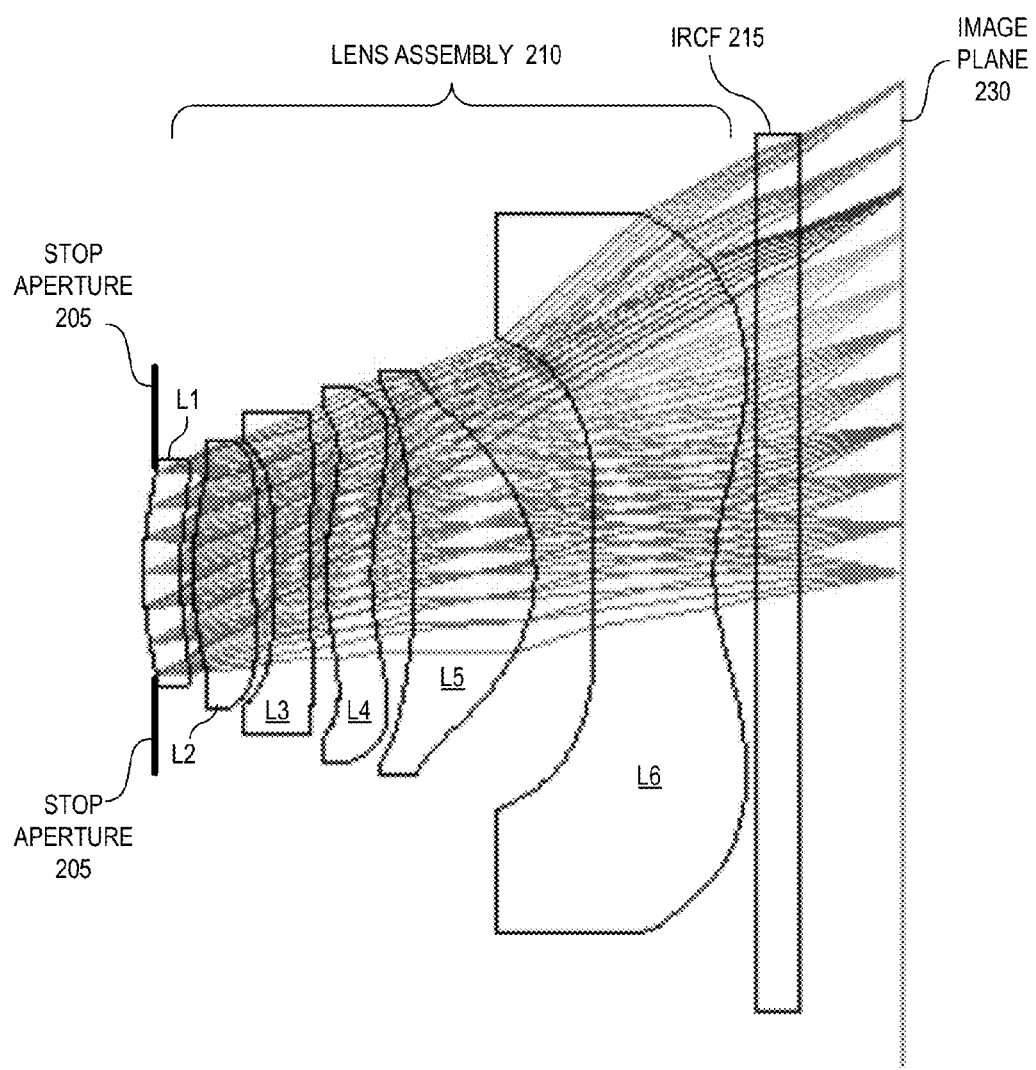
FIG. 3 is a cross-sectional view illustrating light ray bundles passing through the lens assembly, in accordance with an embodiment of the disclosure.

FIGS. 2 and 3 are cross-sectional views illustrating a camera module 200 having a lens assembly that provides a large FOV with reduced optical TTL and improve near-field image recognition, in accordance with an embodiment of the disclosure. FIG. 2 provides an unobstructed cross-sectional view of camera module 200 while FIG. 3 illustrates light ray bundles passing through the lens assembly. The illustrated embodiment of camera module 200 includes a stop aperture 205, a lens assembly 210, an infrared cut filter ("IRCF") 215, and an image sensor 220. The illustrated embodiment of lens assembly 210 has six total lenses including: a lens L1 having surfaces S2 and S3, a lens L2 having surfaces S4 and S5, a lens L3 having surfaces S6 and S7, a lens L4 having surfaces S8 and S9, a lens L5 having surfaces S10 and S11, and a lens L6 having surfaces S12 and S13. The object 225 corresponds to surface S0, stop aperture 205 corresponds to surface S1, and IRCF 215 includes surfaces S14 and S15. The light incident side surface S16 of image sensor 220 is positioned at image plane 230 to capture object image 235.

Lens assembly 210 provides a fixed focus camera module 200 with a large FOV in a compact form factor along the z-axis (the axis running parallel to the depth of field) while achieving good optical characteristics (e.g., acceptable optical distortion, well controlled field curvatures along tangential and sagittal directions, well controlled lateral color, etc.). Various embodiments of lens assembly 210 may range between 80 degrees and 110 degrees for the FOV. In one embodiment, camera module 200 has a diagonal FOV of 90 degrees with an optical TTL of 4.09 mm for image sensor 220 having a full image circle size of 5.6 mm, and stop aperture 205 providing an F-number of 2.4. In this embodiment, IRCF 215 is implemented as a blue glass IRCF having a thickness of 0.25 mm. Of course, camera module 200 may be implemented with its constituent components having other dimensions. For example, the F-number may typically vary between 2.0 to 2.4 for use in a head wearable display, though greater variances may be implemented.

Lens assembly 210 is purposefully designed to induce axial chromatic aberration (see FIG. 4) such that light corresponding to one color channel has a substantially shorter focal distance than light corresponding to the remaining two color channels. In one embodiment, light corresponding to the dominate signal channel of an image sensor is selected to have a longer focal distance than at least one of the other signal channels. Since green light in a typically RGGB Bayer pattern color filter array provides the dominate signal channel (two green filters for each red and blue filter in a unit pixel) and blue light with a shorter wavelength naturally tends to have a shorter focal distance anyway, in one embodiment, lens assembly 210 is designed with axial chromatic aberration that intentionally focuses blue light at a substantially shorter focal distance than green and red light. By doing so, all three color channels of the image sensor can be used to acquire full color far-field pictures, while the monochrome blue channel can be analyzed when acquiring near-field pictures for image recognition. Since the blue contribution in the far-field is less significant than the combination of the green and red channels, far-field picture quality remains acceptable. Since the blue channel has a substantially shorter focal distance, the blue channel of near-field pictures is sharp. This enables a fixed focus camera to have good far-field characteristics for general image capture, while also having good near-field characteristics for image recognition. Image recognition need not be based upon full color images—particularly for OCR, bar code scanning, and 2D code recognition—which are typically based upon black and white objects.

In one embodiment, lens assembly 210 is designed to provide an object focal distance for green light that is greater than twice an object focal distance for blue light. For example, green light may have an object focal distance of approximately 1 m, while blue light has an object focal distance of approximately 0.4 m. Of course, lens assembly 210 may be designed with other object focal distances, but typically the object focal distance for green light will range between 0.7 m to 1.8 m, while the object focal distance for blue light will range between 0.2 m to 0.6 m to provide the above recited near-field and far-field characteristics in a fixed focus camera module. Thus, the blue channel with its shorter focal distance provides a sharper image in the near-field than the green channel with its longer focal distance.

Returning to FIG. 2, lens assembly 210 includes a total of six discrete lenses L1 to L6 with stop aperture 205 positioned in front of (i.e., on the object side of) the first lens L1 in the optical train. In other words, lens assembly 201 does not include any surfaces with optical power on the object side of stop aperture 205.

In the illustrated embodiment, lens L1 has positive optical power, lens L2 has positive optical power, lens L3 has negative optical power, lens L4 has positive optical power, lens L5 has positive optical power, and lens L6 has negative optical power. Thus, lens assembly 210 includes six total lenses with four lenses having varying degrees of positive optical power and two lenses having varying degrees of negative optical power. Thus the total optical power of lens assembly 210 is distributed across the six lenses L1 to L6. The illustrated embodiments of lens L1 to L6 are discrete elements within intervening air gaps. These discrete lenses can be fabricated of a variety of materials (e.g., plastic, glass, etc.). In one embodiment, lens L1 to L6 are fabricated of injection molded plastics for high volume manufacturing.

Lens L1 is the first inline lens in the optical train and is positive, contributing to the total positive optical power. Lens L1 operates to reduce the large ray angle of the upper marginal ray for large off-axis field heights. This reduction of ray angle helps to reduce optical aberration for the upper marginal rays for the large off-axis field heights. The Abbe number is a measure of a transparent material's dispersion in relation to its index of refraction. In one embodiment, lens L1 is made of a material having the lowest Abbe number of the lenses with positive optical power, thereby contributing substantially to axial color aberration.

Lens L2 is the second inline lens in the optical train and is strongly positive, therefore contributing to the total positive optical power. Lens L2 is designed to have a high Abbe number thereby reducing its contribution to axial color aberration (dispersion).

Lens L3 is the third inline lens in the optical train and has negative optical power. The negative optical power of lens L3 reduces the field curvature of lens assembly 210. Lens L3 may also be made of a material having low Abbe number and partially offsets axial color aberration induced by the positive power lenses.

Lens L4 is the fourth inline lens in the optical train and is weakly positive, but contributes to the overall positive optical power. In one embodiment, lens L4 has the weakest positive power of all the positive lenses.

Lens L5 is the fifth inline lens in the optical train and has positive optical power, contributing to the overall positive optical power. Lens L5 is strongly positive. In one embodiment, lens L5 has the strongest positive optical power (i.e., shortest focal length of the positive lenses). Lens L5 is made of a material having a high Abbe number thereby reducing its contribution to axial color aberration.

Lens L6 is the sixth inline lens in the optical train and has negative optical power. In one embodiment, lens L6 has the strongest negative optical power of the lenses having negative optical power. In the illustrated embodiment, lens L6 is the largest lens in lens assembly 210. Lens L6 has an inflection point in the curvature of surface S13 and no inflection point in the curvature of surface S12. Lens L6 operates as a field corrector. The rays from different field heights fall on different regions of lens L6, which servers to correct field curvature, control optical distortion, and control the chief ray angle in the image space. For some implementations of image sensor 220 (e.g., CMOS image sensors), the chief ray angle in the image space should be kept below 32 degrees to maintain desirable quantum efficiency and low cross-talk. To achieve this, the chief ray angle for large field heights should be constrained. Lens L6 serves as a field corrector to maintain reasonable chief ray angles.

In the illustrated embodiment, lens L6 is the largest lens and larger than lens L5. The diameter of lens L6 is sufficiently large while the diameter of lens L5 sufficiently small, relative to lens L6, such that the convex shape of surface S11 extends into a recess formed by the concave surface S12 of lens L6. This design feature contributes to the overall compactness of the optical TTL.

IRCF 215 may be implemented using a variety of different types of filters to cut out the infrared spectrum. For example, IRCF 215 may be implemented as a pigmented or absorptive color filter (e.g., blue glass filter) or an interference filter. However, given that an interference filter operates by reflecting the IR wavelengths back into lens assembly 210, these reflections may again bounce back towards image sensor 220 due to the refractive index interfaces at each lens surface. Accordingly, absorptive type IRCF may be more effective at removing infrared wavelengths. These wavelengths are removed, since they are not visible to the human eye, but may be picked up by image sensor 220. In one embodiment, IRCF 215 is a blue glass infrared cut filter having a thickness of 0.25 mm.

Image sensor 220 is positioned such that its light sensitive surface S16 is coincident with the image plane 230 of lens assembly 210. Image sensor 220 may be implemented using a variety of technologies including charged coupled devices ("CCD") sensors or complementary metal-oxide-semiconductor ("CMOS") sensors. In one embodiment, image sensor 220 is a 1/3.2" 5 megapixel CMOS sensor.

FIGS. 12A & 12B are tables that provide design parameters for implementing an example lens assembly according to the design guidelines set forth above. The table illustrated in FIG. 12A summarizes the radius of curvature, thickness, material type, refractive index, Abbe number, and focal length of each surface S0-S16 (illustrated in FIG. 2) for one demonstrative implementation of camera module 200. Similarly, the table illustrated in FIG. 12B sets forth the conic constant (k) and aspheric coefficients describing the shape of each surface S2 through S13 illustrated in FIG. 2. The coefficients A4 through A16 represent the coefficients in the first seven series elements in the aspheric surface equation, $$z(r) \frac{cr^2}{1 + \sqrt{1 - (1+k)c^2 r^2}} + A_4 r^4 +$$
$$A_6 r^6 + A_8 r^8 + A_{10} r^{10} + A_{12} r^{12} + A_{14} r^{14} + A_{16} r^{16},$$

where c represents the radius of curvature (1/radius), k represents the conic constant, and r represents the radius of the lens.

Figure 4:
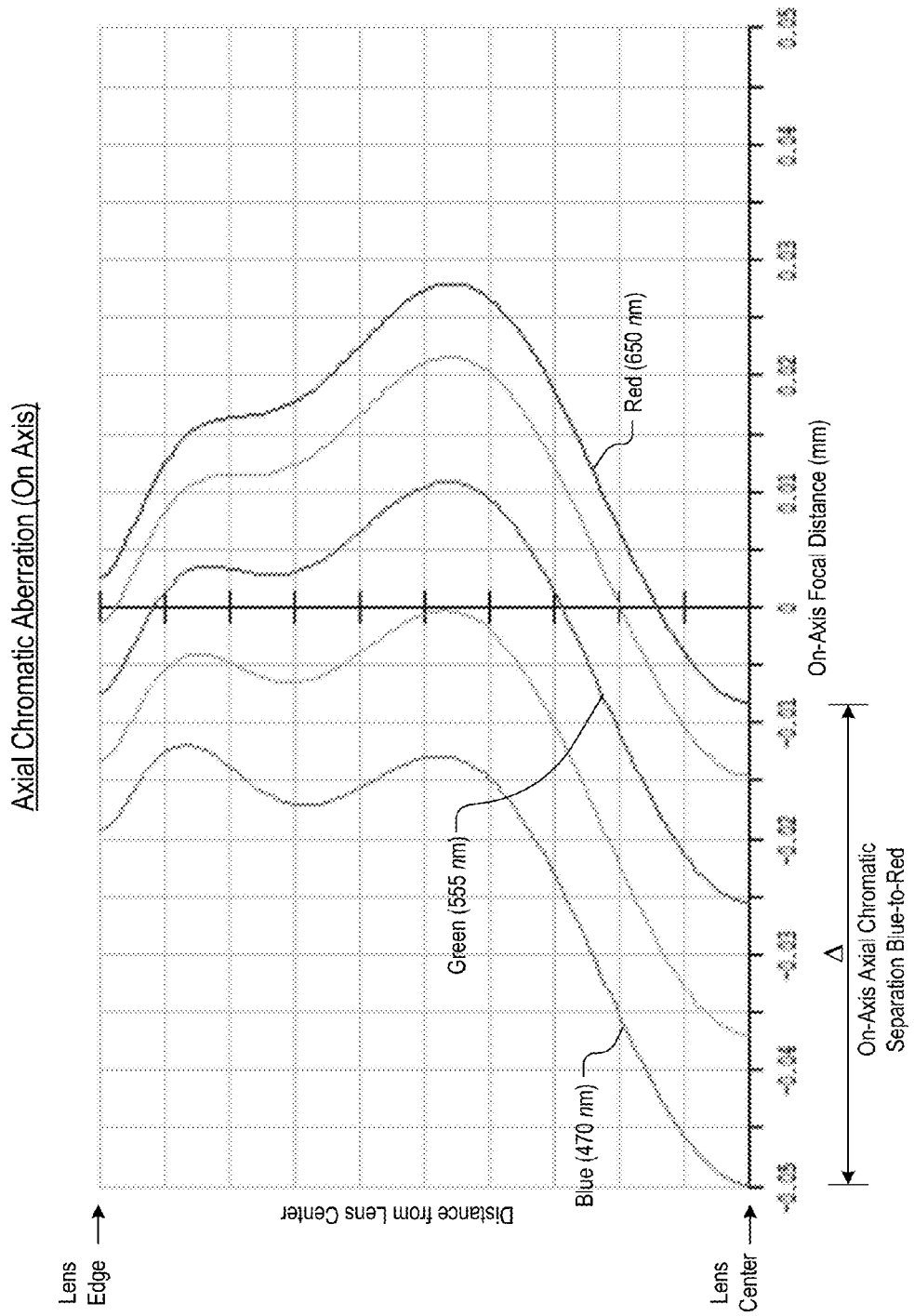
FIG. 4 is a chart illustrating how the current lens design purposefully induces axial chromatic aberration to improve near-field image recognition, in accordance with an embodiment of the disclosure.

FIG. 4 is a chart illustrating how the lens design described above, and detailed in FIGS. 12A-12B, purposefully induces axial chromatic aberration to improve near-field image recognition, in accordance with an embodiment of the disclosure. As illustrated, the illustrated embodiment of lens assembly 210 has an on-axis (at center of lens) axial chromatic separation A between blue light and red light of approximately 42 um. However, in other embodiments, the on-axis axial chromatic separation A may range between 30 um and 50 um. This is in contrast with conventional lens design which attempt to minimize axial chromatic separation. A conventional lens assembly may achieve an on-axis axial chromatic separation of about 10 um.

Figure 5A:
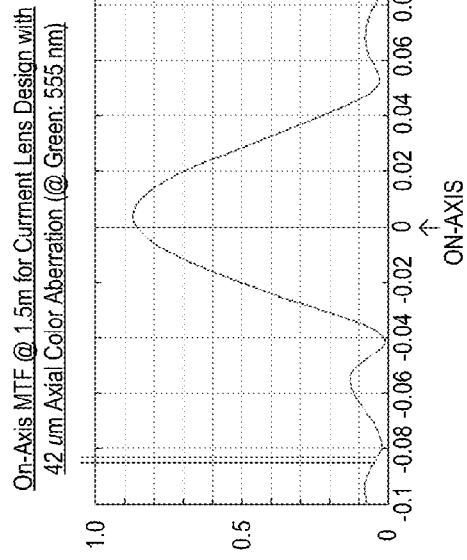
FIGS. 5A & 5B are comparison charts illustrating an MTF for green light at 1.5 m for a conventional lens with only 10 um of on-axis axial color aberration (FIG. 5A) versus the current design with 42 um of on-axis axial color aberration (FIG. 5B), in accordance with an embodiment of the disclosure.
Figure 5B:
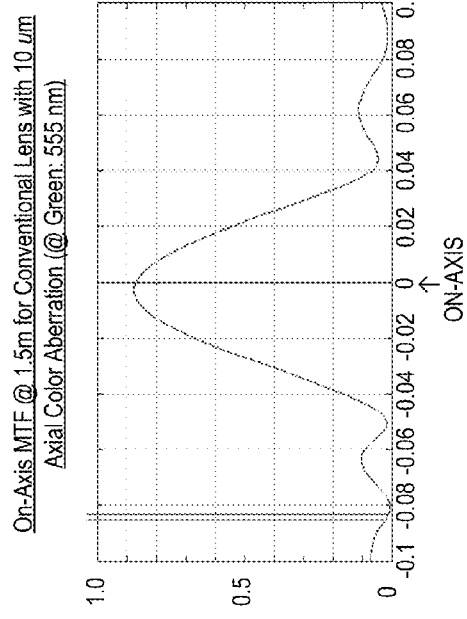

FIGS. 5A & 5B are comparison charts illustrating a modulation transfer function ("MTF") for green light at a 1.5 m object distance (far-field) for a conventional camera module versus camera module 200, in accordance with an embodiment of the disclosure. MTF is the magnitude component of the optical transfer function, a well-known transfer function used to describe how an optical system projects light from an object to an image sensor. The closer the MTF value is to 1.0, the better the image quality of the optical system.

Conventional lenses have an on-axis axial color aberration of approximately 10 um. It is the goal of typical conventional lens designers to minimize axial color aberration, since it separates color images and reduces overall image quality. FIG. 5A illustrates that a conventional lens design having about 10 um of on-axis axial color aberration has an on-axis MTF of about 0.87 for green light (555 nm wavelength). Correspondingly, FIG. 5B illustrates the on-axis MTF for camera module 200 and achieves a comparable on-axis MTF value of 0.87 at a 1.5 m object distance for green light (555 nm wavelength).

Figure 6A:
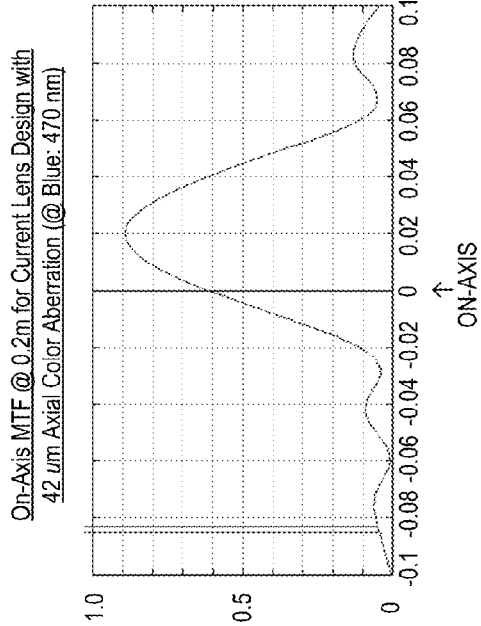
FIGS. 6A & 6B are comparison charts illustrating an MTF for blue light at 0.2 m for a conventional lens with only 10 um of on-axis axial color aberration (FIG. 6A) versus the current design with 42 um of on-axis axial color aberration (FIG. 6B), in accordance with an embodiment of the disclosure.
Figure 6B:
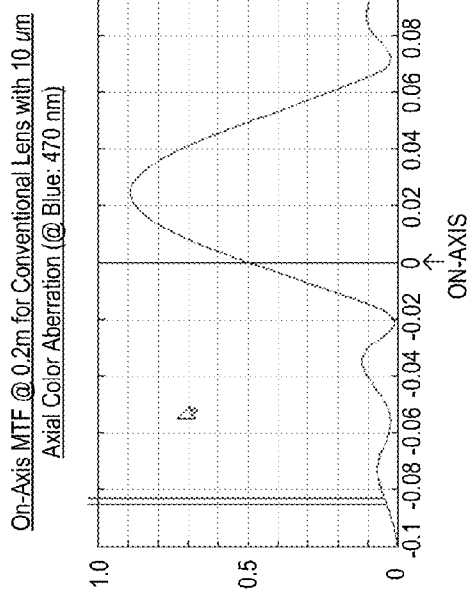

FIGS. 6A & 6B are comparison charts illustrating the MTF for blue light at a 0.2 m object distance (near-field) for a conventional camera module versus camera module 200, in accordance with an embodiment of the disclosure. FIG. 6A illustrates that a conventional lens design having about 10 um of on-axis axial color aberration has an on-axis MTF of about 0.5 for blue light (470 nm wavelength). Correspondingly, FIG. 6B illustrates the MTF for camera module 200 and achieves an on-axis MTF value of 0.6 at a 0.2 m object distance for blue light (470 nm wavelength). Accordingly, FIGS. 5 and 6 illustrate that camera module 200 has comparable image quality for green light in the far-field, but has 20 percent improvement in blue light image quality in the near-field over conventional camera modules with modest axial color aberration. It is noteworthy that the green channel of an image sensor having a typical Bayer color filter array is a more dominant contributor to the overall full color image than the red or blue channels.

Figure 7A:
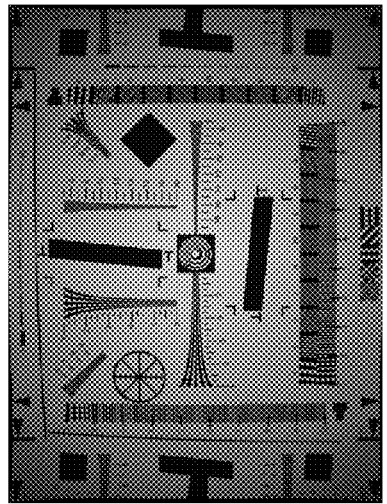
FIGS. 7A & 7B are pictures illustrating image sharpness at a 1.5 m object distance for conventional lens designs (FIG. 7A) versus the current lens design (FIG. 7B), in accordance with an embodiment of the disclosure.
Figure 8A:
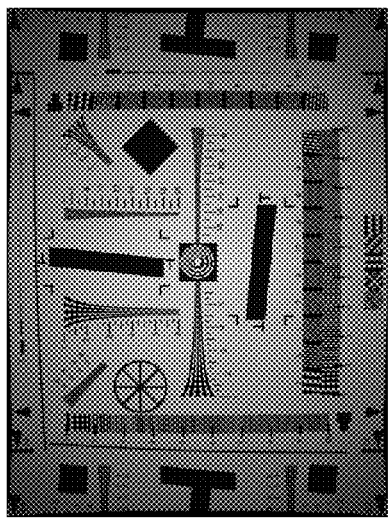
FIGS. 8A & 8B are pictures illustrating image sharpness at a 0.2 m object distance for conventional lens designs (FIG. 8A) versus the current lens design (FIG. 8B), in accordance with an embodiment of the disclosure.
Figure 7B:
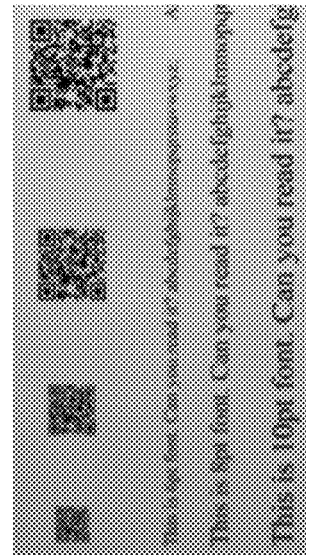
Figure 8B:
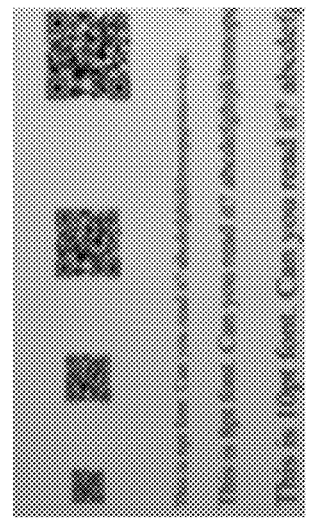

FIGS. 7 and 8 provide visual evidence of what the charts in FIGS. 5 and 6 describe. In particular, FIG. 7A illustrates a picture at a 1.5 m object distance (far-field) using all three red, green, and blue color channels of a conventional image sensor. Correspondingly, FIG. 7B illustrates a picture also at a 1.5 m object distance (far-field) using all three red, green, and blue color channels from camera module 200. As illustrated the two pictures are very similar with little discernible image quality difference. However, FIG. 8A illustrates a picture at a 0.2 m object distance (near-field) using all three red, green, and blue color channels of a conventional image sensor with low axial color aberration. It can be seen that the image quality if fairly low with significant blurriness. In contrast, FIG. 8B illustrates a picture at a 0.2 m object distance (near-field) using only the blue channel of camera module 200. It can be seen that the image quality is significantly improved (sharper) over FIG. 8A and suitable for OCR or other image recognition.

Figure 9:
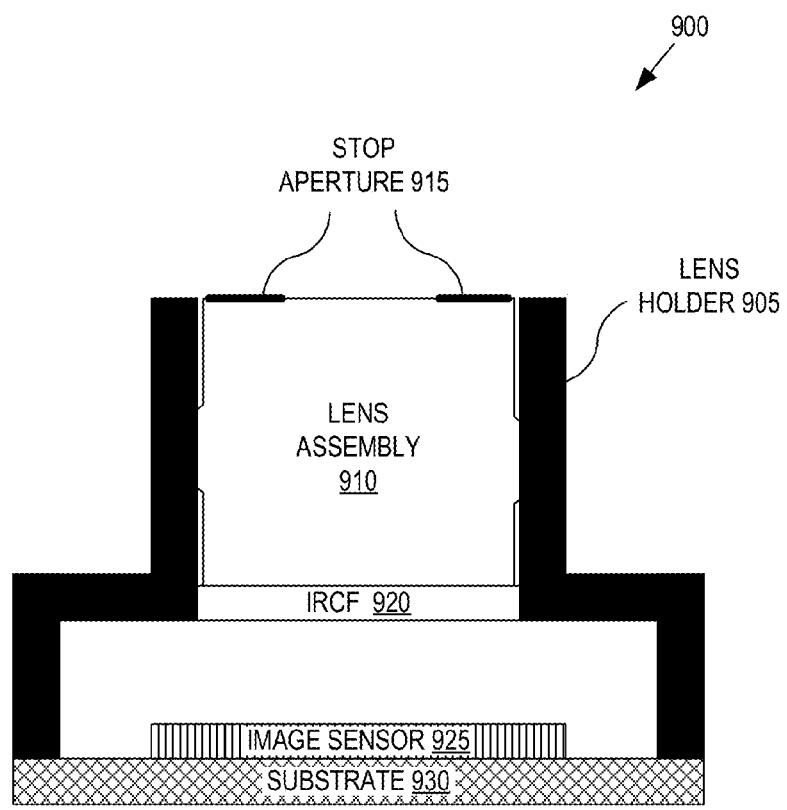
FIG. 9 is a cross-sectional view illustrating a camera module including a barrel style lens assembly, in accordance with an embodiment of the disclosure.

FIG. 9 is a cross-sectional view illustrating a camera module 900 including a barrel style lens assembly, in accordance with an embodiment of the disclosure. The illustrated embodiment of camera module 900 includes a lens holder 905, a lens assembly 910, a stop aperture 915, an IRCF 920, an image sensor 925, and a substrate 930. Camera module 900 represents one possible form factor for implementing camera module 200 illustrated in FIGS. 2 and 3. Correspondingly, lens assembly 910 is an example implementation of lens assembly 910, while stop aperture 915, IRCF 920, and image sensor 925 correspond to implementations of stop aperture 205, IRCF 215, and image sensor 220, respectively.

Lens assembly 910 packages the discrete lens elements (L1 through L6) into a barrel style form factor, which threads into lens holder 905. In one embodiment, lens assembly 910 includes male threads around its perimeter, which mate to female threads on the inside edge of lens holder 905. This thread design facilitates offset adjustment to align the image plane 230 of lens assembly 910 with the light sensitive side S16 of image sensor 925. Lens holder 905 also serves to seal image sensor 925 on top of substrate 930 and prevent dust or other contaminants for accumulating on image sensor 925. It should be appreciated that lens assembly 210 may be implemented in other form factors than the barrel style illustrated in FIG. 9.

Figure 10:
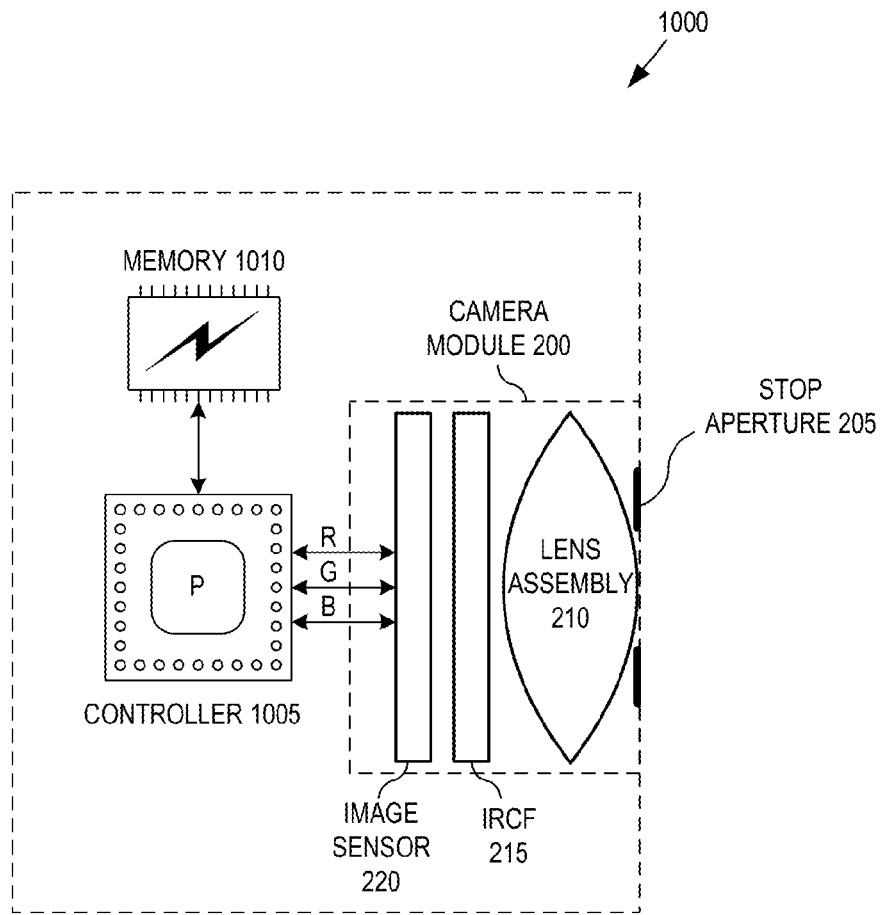
FIG. 10 is a functional block diagram illustrating a camera system, in accordance with an embodiment of the disclosure.

FIG. 10 is a functional block diagram illustrating a camera system 1000, in accordance with an embodiment of the disclosure. The illustrated embodiment of camera system 1000 includes camera module 200, a controller 1005, and memory 1010. Camera system 1000 is well suited for integration within an head wearable display, but may also be used in various other products including smart phones, tablets, laptops, televisions, watches, etc. Camera module 200 provides a high resolution camera having a wide FOV, a compact z-axis form factor, and good near and far field characteristics in a fixed focus design. During operation, controller 1005 may perform a number of post imaging functions including cropping, compression, image analysis, etc. using instructions stored in memory 1010. The acquired images may further be stored into memory 1010, which may be implemented using volatile memory (DRAM, SRAM, etc.) or non-volatile memory (e.g., flash memory, etc.).

In one embodiment, controller 1005 includes hardware logic (or executed software logic stored in memory 1010) to identify near-field objects. In one embodiment, identification of near-field object may be assumed when a user inputs a request to perform image recognition. Other image processing techniques, or otherwise, may be implemented to identify when an object is a near-field object upon which image recognition is to be performed. When it is determined that image recognition is to be performed upon a near-field object, controller 1005 ignores the red and green image signal channels output from camera module 200 and analyzes only the blue channel when performing image recognition. When capturing images of far-field objects, all three RGB color channels of the image signal are used.

Figure 11:
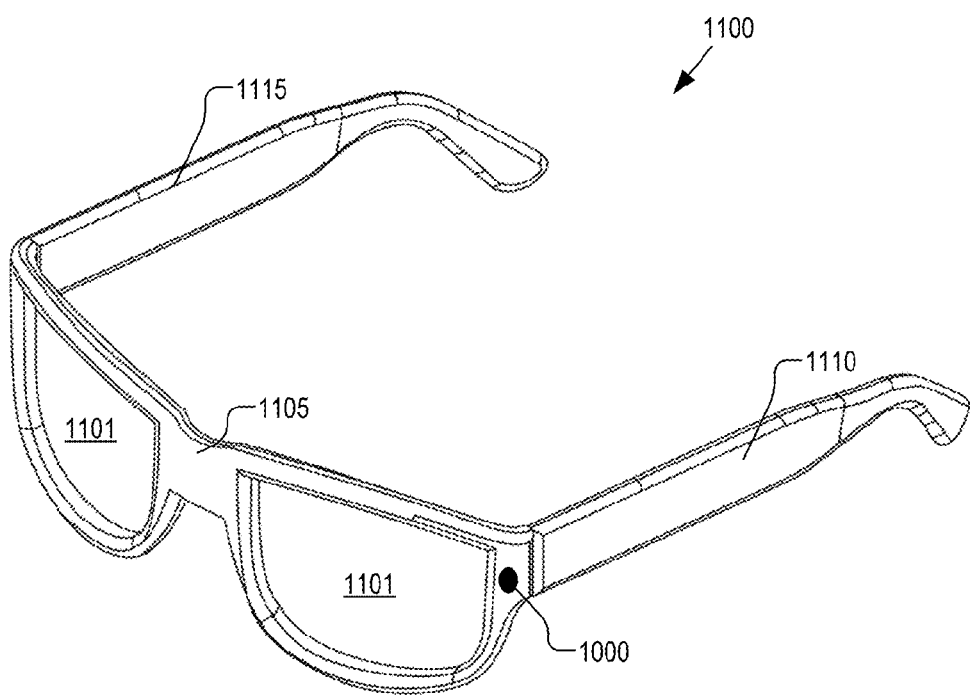
FIG. 11 is a perspective view illustrating a head wearable display that includes a camera system, in accordance with an embodiment of the disclosure.

FIG. 11 is a perspective view illustrating a binocular head wearable display 1100 that may include a camera system 1000, in accordance with an embodiment of the disclosure. The illustrated embodiment of binocular head wearable display 1100 includes two see-through displays 1101 that may present each eye of the user with a computer generated image ("CGI") superimposed over there vision of the external world. Camera system 1000 may be used to capture images of the external world, which are then processed by controller 1005 to generate CGI that is context sensitive to the user's environment.

The see-through displays 1101 are mounted to a frame assembly, which includes a nose bridge 1105, left ear arm 1110, and right ear arm 1115. Camera system 1000 may be disposed in any of portion of the frame assembly with a forward facing perspective. In other embodiments, camera module 1000 may be a rear facing camera positioned to capture eye images for eye tracking functionality, in addition to, or in place of, a forward facing camera. Although FIG. 11 illustrates a binocular embodiment, display 1100 may also be implemented as a monocular display.

The see-through displays 1101 are secured into an eye glass arrangement or head wearable display that can be worn on the head of a user. The left and right ear arms 1110 and 1115 rest over the user's ears while nose bridge 1105 rests over the user's nose. The frame assembly is shaped and sized to position each display in front of a corresponding eye of the user. Other frame assemblies having other shapes may be used (e.g., a visor with ear arms and a nose bridge support, a single contiguous headset member, a headband, goggles type eyewear, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A camera apparatus, comprising:
   an image sensor to output an image signal including a red channel, a green channel, and a blue channel;
   a stop aperture; and
   a lens assembly disposed between the image sensor on an image side of the lens assembly and the stop aperture on an object side of the lens assembly, the lens assembly including a plurality of lens elements that collectively induce axial chromatic aberration between red, green, and blue light, wherein the lens assembly has a first object focal distance for the green light that is between 0.7 m and 1.8 m while having a second object focal distance for the blue light that is between 0.2 m and 0.6 m; and
   a controller coupled to receive the red, green, and blue channels of the image signal, wherein the controller includes logic, that when executed by the controller causes the controller to perform operations including:

using the blue channel without the red or green channels of the image signal to perform image recognition on objects captured in a near-field of the lens assembly; and using the blue, red, and green channels collectively when capturing images in a far-field of the lens assembly.

2. The camera apparatus of claim 1, wherein the first object focal distance for the green light is greater than twice the second object focal distance for the blue light.

3. The camera apparatus of claim 2, wherein the first object focal distance for the green light is approximately 1 m and the second object focal distance for the blue light is approximately 0.4 m.

4. The camera apparatus of claim 2, wherein the lens assembly includes an axial chromatic aberration between the blue light and the red light ranging between 30 um to 50 um.

5. The camera apparatus of claim 4, wherein the lens assembly has a field of view ranging between 80 degrees and 110 degrees.

6. The camera apparatus of claim 4, wherein the lens assembly includes six lenses, wherein four of the six lenses have positive optical power and two of the six lenses have negative optical power, wherein the six lenses include first, second, third, fourth, fifth, and sixth lenses having first inline, second inline, third inline, fourth inline, fifth inline, and sixth inline relative positions, respectively, along an optical path through the lens assembly.

7. The camera apparatus of claim 6, wherein the first, second, fourth, and fifth lenses all have positive optical power while the third and sixth lenses have negative optical power.

8. The camera apparatus of claim 6, wherein the fourth lens has weaker positive optical power than any of the six lenses having positive optical power and the fifth lens has stronger positive optical power than any of the six lenses having positive optical power.

9. The camera apparatus of claim 6, wherein the sixth lens is the only lens of the six lenses having an inflection point on its image side and no inflection point on its object side.

10. The camera apparatus of claim 9,
wherein the sixth lens has a concave surface on its image side,
wherein the fifth lens has a convex surface on its image side,
wherein the fifth lens has a smaller diameter than the sixth lens, and
wherein the convex surface of the fifth lens extends into a recess formed by the concave surface of the sixth lens.

11. The camera apparatus of claim 2, wherein the lens assembly does not include any surfaces with optical power on the object side of the stop aperture.

12. The camera apparatus of claim 1, wherein the camera apparatus is disposed within a head wearable display or a cellular phone.

13. The camera apparatus of claim 1, wherein image recognition comprises one or more of optical character recognition, bar code scanning, 2D code recognition, facial recognition, or object recognition.

14. The camera apparatus of claim 1, wherein the logic comprises at least one of hardware logic or software instructions executable by the controller.

15. The camera apparatus of claim 1, further comprising: an infrared cut filter disposed between the image sensor and the lens assembly.

16. A camera system, comprising:
an image sensor to output an image signal including a red channel, a green channel, and a blue channel;
a stop aperture; and
a lens assembly disposed between the image sensor on an image side of the lens assembly and the stop aperture on an object side of the lens assembly, the lens assembly including six lenses, wherein four of the six lenses have positive optical power and two of the six lenses have negative optical power, wherein the six lenses include first, second, third, fourth, fifth, and sixth lenses having first inline, second inline, third inline, fourth inline, fifth inline, and sixth inline relative positions, respectively, along an optical path through the lens assembly,
wherein the lens assembly has a first object focal distance for the green light that is greater than twice a second object focal distance for the blue light,
wherein the six lenses of the lens assembly collectively induce axial chromatic aberration between red, green, and blue light to increase image sharpness in a near-field of the lens assembly using the blue channel compared to the green channel,
wherein the first object focal distance for the green light is between 0.7 m to 1.8 m while the second object focal distance for the blue light is between 0.2 m to 0.6 m.

17. The camera system of claim 16, further comprising:
a controller coupled to receive the red, green, and blue channels of the image signal, wherein the controller includes logic, that when executed by the controller causes the controller to perform operations including:
using the blue channel without the red or green channels of the image signal to perform image recognition on objects captured in a near-field of the lens assembly; and
using the blue, red, and green channels collectively when capturing images in a far-field of the lens assembly.

18. The camera system of claim 17, wherein the lens assembly includes an axial chromatic aberration between the blue light and the red light ranging between 30 um to 50 um.

19. The camera system of claim 17, wherein image recognition comprises one or more of optical character recognition, bar code scanning, 2D code recognition, facial recognition, or object recognition.

20. The camera system of claim 16, wherein the lens assembly has a field of view ranging between 80 degrees and 110 degrees.

21. The camera system of claim 16, wherein the first, second, fourth, and fifth lenses all have positive optical power while the third and sixth lenses have negative optical power.

22. The camera system of claim 16, wherein the fourth lens has weaker positive optical power than any of the six lenses having positive optical power and the fifth lens has stronger positive optical power than any of the six lenses having positive optical power.

23. The camera system of claim 16, wherein the sixth lens is the only lens of the six lenses having an inflection point on its image side and no inflection point on its object side.

24. The camera system of claim 23,
wherein the sixth lens has a concave surface on its image side,
wherein the fifth lens has a convex surface on its image side,
wherein the fifth lens has a smaller diameter than the sixth lens, and wherein the convex surface of the fifth lens extends into a recess formed by the concave surface of the sixth lens.

* * * * *